Dec. 13, 1960
D. L. MUIR
2,964,328
TOOL CART
Filed Feb. 20, 1959
2 Sheets-Sheet 1
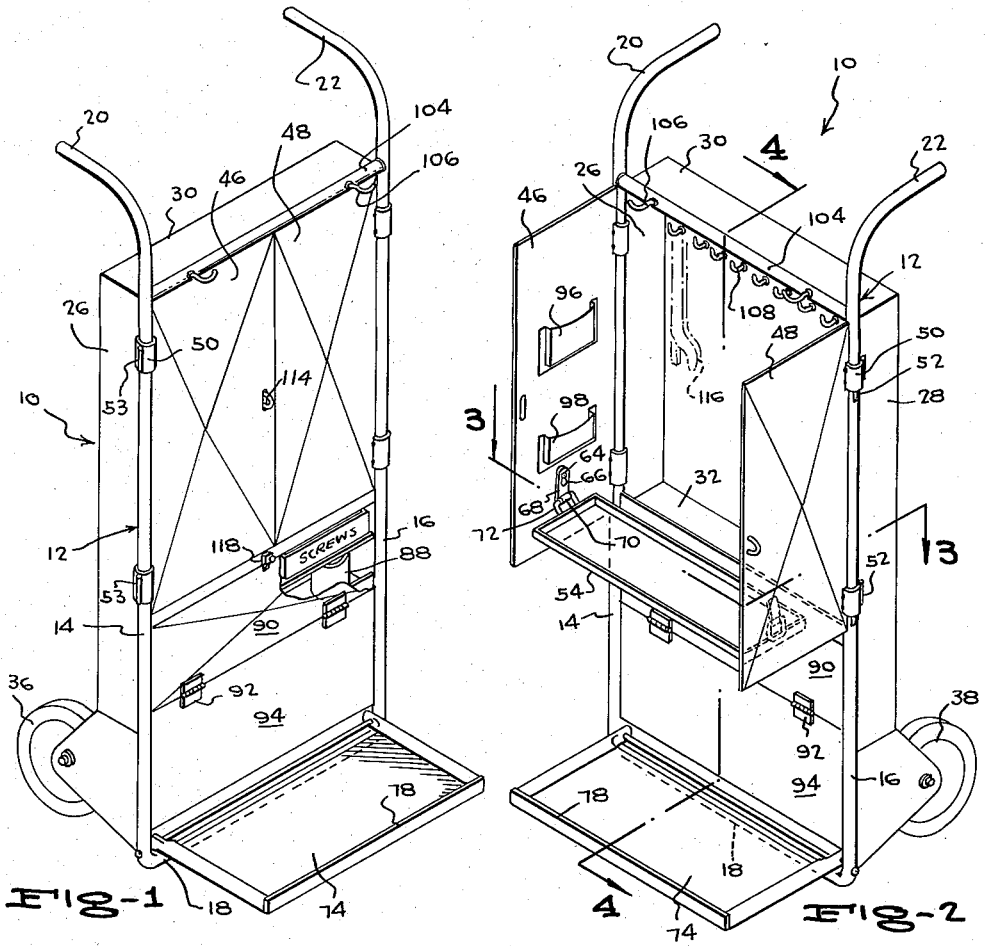
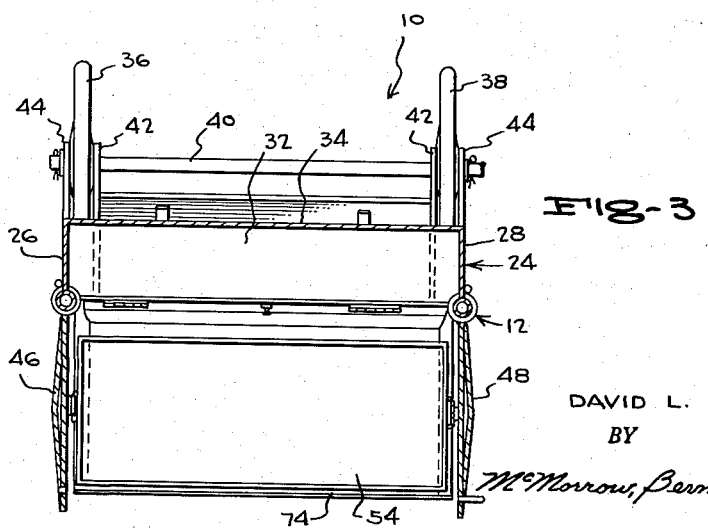
INVENTOR.
DAVID L. MUIR
BY
McMorrow, Berman & Davidson
ATTORNEYS Dec. 13, 1960 D. L. MUIR 2,964,328
TOOL CART
Filed Feb. 20, 1959 2 Sheets-Sheet 2

INVENTOR.
DAVID L. MUIR
BY
McMorrow, Berman & Davidson
ATTORNEYS

United States Patent Office 2,964,328
Patented Dec. 13, 1960

2,964,328
TOOL CART

David L. Muir, 925 Cadogan St., Nanaimo,
British Columbia, Canada

Filed Feb. 20, 1959, Ser. No. 794,591

3 Claims. (Cl. 280—47.19)

The present invention relates to a cart for transporting, storing, and supporting hand tools such as are employed by millwrights, plumbers, automotive mechanics, and the like.

In the larger manufacturing establishments, such as paper and pulp mills, and the like, maintenance men, millwrights, and other mechanics are employed to keep in repair many types of machines. The time that a machine is shut down for repairs is generally valuable and frequently many operations are forced to be discontinued while a single machine is being overhauled. An efficient practice generally acceptable is to take to the out-of-service machine all of the tools required to return the machine to service. In most mills this entails transporting a considerable number of tools in order that the mechanic be equipped to repair a disabled machine without necessitating the return of the mechanic to the maintenance shop of the mill for a particular tool.

An object of the present invention therefore is to provide a cart for transporting hand tools in considerable numbers having a total weight greater than what may be conveniently hand carried to the disabled machine in a mill or machine shop.

Another object of the present invention is to provide a hand cart for storing, transporting, and supporting hand tools which lends itself to employment in automotive repair shop, for use by automotive mechanics; the hand cart being provided with closable compartments in which hand tools may be supported and stored, and one which may be moved over a floor surface with ease and facility.

A further object of the present invention is to provide a cart for transporting and supporting hand tools which is sturdy in construction, one simple in structure easily fabricated of common materials, one economically feasible, and one which is highly effective in action.

These and other objects and advantages of the present invention will be fully apparent from the following description when taken in conjunction with the annexed drawings, in which:

Figure 1 is an isometric view of the tool cart of the present invention, as viewed from the front and one side, the doors of the main tool compartment being shown in closed position;

Figure 2 is an isometric view of the cart, as viewed from the front and the other side, the main compartment doors being shown open and supporting a tray;

Figure 3 is a view, on an enlarged scale, taken on the line 3—3 of Figure 2;

Figures 4, 5:
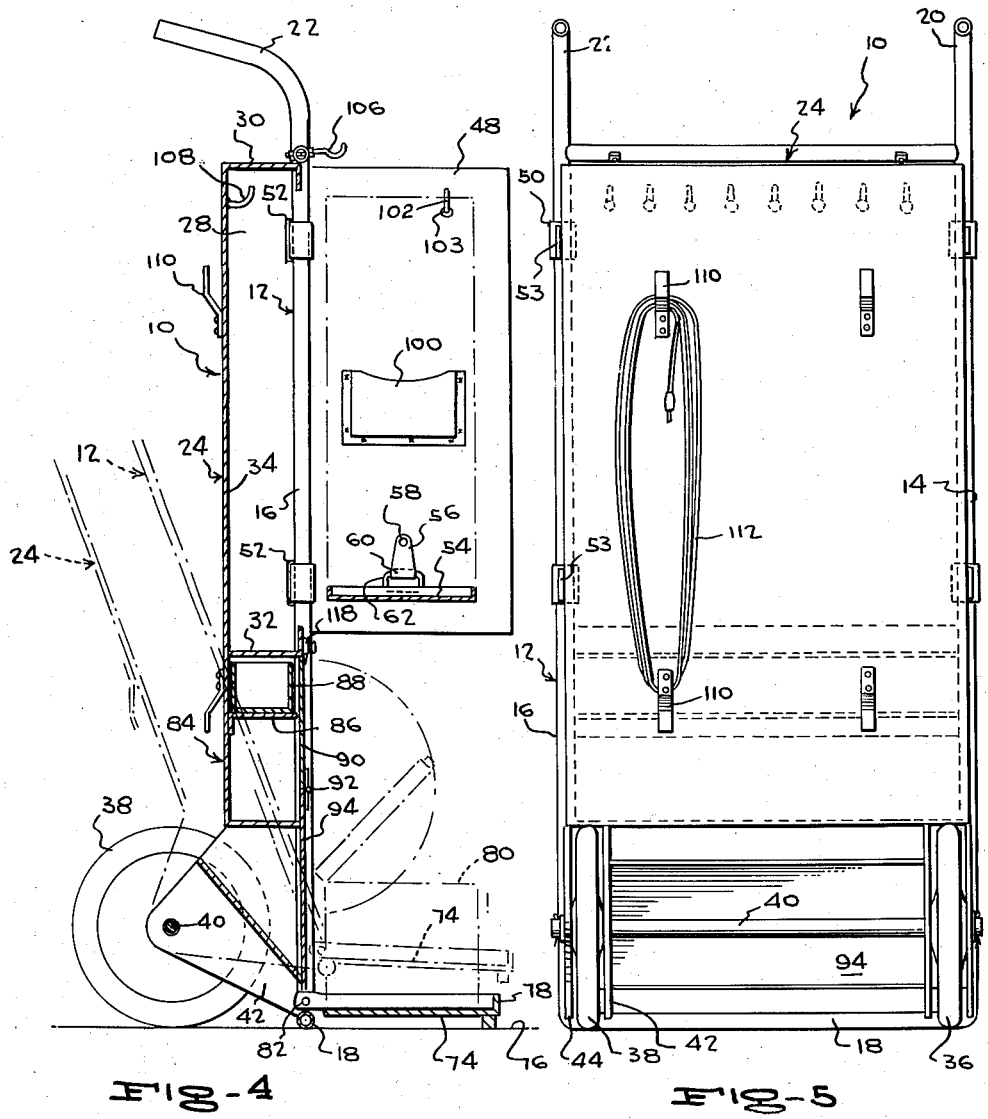
Figure 4 is a view on an enlarged scale, taken on the line 4—4 of Figure 2.
Figure 5 is an elevational view of the cart of the present invention as viewed from the back.

Referring in greater detail to the drawings in which like numerals indicate like parts throughout the several views, the tool cart of the present invention is designated generally by the reference numeral 10 and comprises an upstanding U-shaped frame structure 12 having legs 14 and 16 and a bight 18 connecting the lower ends of the legs 14 and 16 together. The upper end portions of the legs 14 and 16 are bent rearwardly to form handle members 20 and 22.

The frame structure 12 includes a shallow substantially upright and forwardly facing open front compartment 24 having spaced side walls 26 and 28, a top wall 30, a bottom wall 32, and a back wall 34. The top and bottom walls 30 and 32 connect together the upper and lower ends of the side walls 26 and 28 and the back wall 34 extends over the rearward edges of the side walls 26 and 28 and the rearward edges of the top and bottom walls 30 and 32.

A pair of supporting wheels 36 and 38 are rotatably attached to an axle 40 which extends between and has its end portions journaled in extension plates 42 and 44 projecting rearwardly on each side of the lower end of the compartment 24 and rearwardly of the portions of the frame structure legs 14 and 16 adjacent the bight 18 of the latter.

A pair of doors 46 and 48 are arranged in confronting side edge to edge relation and are positioned so as to close the open front of the compartment 24. The nonconfronting side edges of the doors 46 and 48 are provided with sleeves 50 circumposed about the adjacent legs 14 and 16, respectively, and prevented from sliding down on the legs 14 and 16 by the lower walls of slots 52 cut in the side walls 26 and 28. Each sleeve 50 has a stop 53 welded to it for holding the adjacent door 46, 48 from swinging beyond the perpendicular position forwardly and outwardly of the open front of the compartment 24, as shown in Figure 2.

A tray 54 is normally arranged so as to extend along and abuttingly held in place against the inner face of the door 48. Means is provided detachably connecting one end of the tray 54 to the door 48 for movement from the abutting position to a position transversely between the doors 46 and 48 when the doors 46 and 48 have been swung to the open position outwardly of the compartment open front. This means consists in a strap member 56 hung on a pivot pin 58 which projects from the inner face of the door 48. The lower end of the strap member 56 is provided with an eye formation 60 receiving the bight of an inverted U-shaped handle member 62 carried by the one end of the tray 54.

Releasable cooperating latching means is provided on the upper end of the tray 54 and on the inner face of the door 46 for holding the tray 54 in the transverse position. This latching means consists in a pin 64 received in one end of an elongated slot 66 provided in the upper end portion of a second strap member 68 having an eye formation 70 on the lower end receiving the bight of another inverted U-shaped handle member 72 carried by the adjacent end of the tray 54. The pins 58, 64, and strap members 56, 68, constitute means connecting the tray 54 to the doors 46 and 48 for free swinging movement, in dependent fashion, about the pins 58 and 64 as axes.

A platform 74 extends perpendicularly forwardly from the frame structure 12 at the lower end of the latter and is connected to the frame structure 12 for limited movement from the perpendicular position to a position at an angle with respect to the frame structure 12. This movement of the platform 74 relative to the frame structure 12 permits tilting movement of the frame structure 12 from the full line position shown in Figure 4 to the dotted line position shown in Figure 4 and raising of the platform 74 from the position resting upon the floor surface 76 to a substantially horizontal position above the floor surface 76, as shown in dotted lines in Figure 4.

The platform 74 has a rim 78 extending about its sides and front and it is adapted to support a tool chest thereon, the tool chest being shown in Figure 4 in dotted lines and designated by the reference numeral 80.

The ends of the rim 78 adjacent the frame structure 12 project beyond the edge of the platform 74 and over the bight 18 of the frame structure 12. Pins 82 extend through holes provided in the frame structure legs 14 and 16 and through the projecting end portions of the rim 78 and connect the platform 74 to the frame structure 12 for limited swinging upwardly and downwardly movement relative to the frame structure 12. In the downward position, the projecting end portions of the rim 78 bind against the bight 18 of the frame structure 12 and are prevented from swinging any further downward.

The frame structure 12 includes a shallow subsidiary substantially upright and forwardly facing open front compartment 84 below the compartment 24. The compartment 84 is subdivided by horizontally disposed shelves 86 adapted for support thereon of one or more containers 88.

A single door 90 normally closes the front of the subsidiary compartment 84 and is connected by hinges 92 to the upper end of a panel 94 for swinging movement from the closing position to an open position below the open front of the compartment 84. The panel 94 extends between the legs 14, 16 of the frame structure 12 and has its ends secured to such legs 14 and 16. The lower edge of the panel 94 is spaced above the bight 18 of the frame structure 12.

Pockets 96 and 98 are arranged in spaced relation on the inner face of the door 46 and another pocket 100 is carried by the inner face of the door 48. A latch element 102 is pivotally mounted on the inner face of the door 48 for movement into and out of a hole 103 provided in the bottom of the tray 54 adjacent the upper end when the tray is in the vertical portion abutting the inner face of the door 48.

A cross frame member 104 extends between the legs 14 and 16 adjacent their upper ends and adjacent the upper end of the compartment 24. Hooks 106 project from the cross frame member 104 and other hooks 108 project forwardly of the compartment back wall 34 adjacent the upper end of the latter.

The exterior face of the back wall 34 of the compartment 24 carries other hooks 110 for winding thereon of extension cords and the like. One such extension cord is shown in Figure 5 and designated by the numeral 112.

A hasp assembly 114 is mounted upon the portions of the doors 46 and 48 adjacent their confronting edges and is adapted to receive therethrough a lock for securing the compartment 24 against unauthorized use.

In use, the cart 10 may be employed to support tools within the compartment 24 or within the compartment 84. One tool is shown in dotted lines in Figure 2 and designated by the reference numeral 116 and is shown hanging from one of the hooks 108. Normally, the tray 54 is positioned vertically on the inner face of the door 48 and it is manually moved to the transverse position after the doors 46 and 48 have been shifted to their position outwardly of the compartment open front. The tool chest 80 is normally supported upon the platform 74 for movement therewith and the cart 10 is transported over the floor surface 76 to where it is needed with the platform 74 in the raised position and the frame structure 12 sloping rearwardly to a position in which the handle members 20 and 22 may be easily grasped and supported by the user of the hand cart 10 of the present invention. The tray 54 may be used to support tools when the cart has been moved to the place of use and there is no danger of the tools falling from the tray 54 when the cart 10 is moved due to the swinging movement of the tray 54 and its horizontal position at all times irrespective of the tilting of the compartment 24 with the frame structure 12. A latch element 118 normally secures the door 90 over the open front of the subsidiary compartment 84 and is manually releasable to lower the door 90 from the vertical position closing the open front of the compartment 84 to the position below the compartment open front. The compartment 84 may be used to contain various sized containers, as at 88 in Figures 1 and 4 for the storage of articles which are needed by the user of the cart of the present invention.

What is claimed is:

1. A tool cart comprising an upstanding U-shaped frame structure having spaced legs and a bight connecting the lower ends of said legs together, the upper portions of said legs being bent rearwardly to form handle members, a shallow substantially upright and forwardly facing open front compartment fixedly supported on said legs between the lower ends of said legs and said handle members, said compartment including a back wall, spaced side walls rising from said back wall, and top and bottom walls rising from said back wall and connecting together the upper and lower ends of said side walls respectively, a plurality of hooks projecting forwardly of said compartment back wall for support of tools thereon, an extension plate projecting rearwardly from each side of the lower end of said compartment, an axle supported in said extension plates, a pair of supporting wheels rotatably attached to said axle, a cross frame member extending between said legs adjacent the upper ends and adjacent the upper end of said compartment, a plurality of hooks projecting from said cross frame member for support of tools thereon, a pair of doors arranged in confronting side edge to edge relation positioned so as to close the open front of said compartment and each having the nonconfronting side edge connected to the adjacent side wall for swinging movement from the edge to edge position to a position in which it is outwardly of said open front, and a platform extending perpendicularly forwardly from said frame structure at its lower end and connected to said frame structure legs for limited movement from the perpendicular position to a position at an angle with respect to said frame structure, said platform being adapted to support a tool box thereon.

2. A tool cart comprising an upstanding U-shaped frame structure having spaced legs and a bight connecting the lower ends of said legs together, the upper portions of said legs being bent rearwardly to form handle members, a shallow substantially upright and forwardly facing open front compartment fixedly supported on said legs between the lower ends of said legs and said handle members, said compartment including a back wall, spaced side walls rising from said back wall, and top and bottom walls rising from said back wall and connecting together the upper and lower ends of said side walls respectively, a plurality of hooks projecting forwardly of said compartment back wall for support of tools thereon, an extension plate projecting rearwardly from each side of the lower end of said compartment, an axle supported in said extension plates, a pair of supporting wheels rotatably attached to said axle, a cross frame member extending between said legs adjacent the upper ends and adjacent the upper end of said compartment, a plurality of hooks projecting from said cross frame member for support of tools thereon, a pair of doors arranged in confronting side edge to edge relation positioned so as to close the open front of said compartment and each having the nonconfronting side edge connected to the adjacent side wall for swinging movement from the edge to edge position to a position in which it is outwardly of said open front, a tray normally arranged so as to extend along and abuttingly against the inner face of one of said doors and having the lower end connected to the inner face of said door for swinging movement of said tray from the abutting position to a position transversely between said doors when said doors have been shifted to the position in which they are outwardly of said open front, releasable cooperating latching means on the upper end of said tray and the inner face of the other of said doors for holding the tray in the transverse position, and a platform extending perpendicularly forwardly from said frame structure at its lower end and connected to said frame structure legs for limited movement from the perpendicular position to a position at an angle with respect to said frame structure, said platform being adapted to support a tool box thereon.

3. A tool cart comprising an upstanding U-shaped frame structure having spaced legs and a bight connecting the lower ends of said legs together, the upper portions of said legs being bent rearwardly to form handle members, a shallow substantially upright and forwardly facing open front compartment fixedly supported on said legs between the lower ends of said legs and said handle members, said compartment including a back wall, spaced side walls rising from said back wall, and top and bottom walls rising from said back wall and connecting together the upper and lower ends of said side walls respectively, a plurality of hooks projecting forwardly of said compartment back wall for support of tools thereon, an extension plate projecting rearwardly from each side of the lower end of said compartment, an axle supported in said extension plates, a pair of supporting wheels rotatably attached to said axle, a cross frame member extending between said legs adjacent the upper ends and adjacent the upper end of said compartment, a plurality of hooks projecting from said cross frame member for support of tools thereon, a pair of doors arranged in confronting side edge to edge relation positioned so as to close the open front of said compartment and each having the nonconfronting side edge connected to the adjacent side wall for swinging movement from the edge to edge position to a position in which it is outwardly of said open front, a shallow subsidiary substantially upright and forwardly facing open front compartment below said first-mentioned compartment and supported on said frame structure legs, a single door normally closing the open front of said subsidiary compartment and connected along its lower edge to said frame structure for movement to an open position below said subsidiary compartment, latching means on said frame structure and releasably engageable with said single door when in closed position to retain the latter door in closed position, and a platform extending perpendicularly forwardly from said frame structure at its lower end and connected to said frame structure legs for limited movement from the perpendicular position to a position at an angle with respect to said frame structure, said platform being adapted to support a tool box thereon.

References Cited in the file of this patent

UNITED STATES PATENTS

| | | |
|---|---|---|
| 1,581,840 | De Garmo | Apr. 20, 1926 |
| 1,653,927 | Pryor | Dec. 27, 1927 |
| 1,919,986 | Powers | July 25, 1933 |
| 1,921,251 | Gerould | Aug. 8, 1933 |
| 2,110,068 | Kowalski | Mar. 1, 1938 |
| 2,525,208 | Clink | Oct. 10, 1950 |
| 2,835,503 | Humphries | May 20, 1958 |